United States Patent [19]

Gaubis

[11] Patent Number: 4,835,955

[45] Date of Patent: Jun. 6, 1989

[54] HAND-OPERATED FRUIT PICKER

[76] Inventor: Alfred E. Gaubis, P.O. Box 597, Fruitland Park, Fla. 32731

[21] Appl. No.: 190,356

[22] Filed: May 5, 1988

[51] Int. Cl.[4] .............................................. A01D 46/24
[52] U.S. Cl. ...................................... 56/333; 56/334; 56/332
[58] Field of Search .................................. 56/332–340

[56] References Cited

U.S. PATENT DOCUMENTS

| 397,334 | 2/1889 | Brooks | 56/337 |
|---|---|---|---|
| 721,154 | 2/1903 | Clark | 56/340 |
| 1,133,381 | 3/1915 | Kellogg | 56/334 |
| 1,968,414 | 7/1934 | Melown | 56/334 |
| 2,135,354 | 11/1938 | Sammons | 56/336 |
| 2,508,805 | 5/1950 | Scott | 56/338 |
| 4,098,062 | 7/1978 | Gaubis | 56/334 |

Primary Examiner—John Weiss
Attorney, Agent, or Firm—Warren L. Franz

[57] ABSTRACT

A hand-operated fruit picker having a cage defining a fruit gathering chamber with a fruit receiving frontal opening, an upper concavity and a top central forwardly directed stem slit, and a gate hinged to the cage for movement from a fruit receiving to a fruit clamping position, is provided with an outwardly diverging scoop-like extension formed at the top forward margin of the opening to envelop the lateral members of a fruit cluster, and is further provided with removable chamber and gate linings of resilient tufted material contoured to extend the concavity of the chamber and serving to protect more sensitive and fragile fruits against bruising.

20 Claims, 1 Drawing Sheet

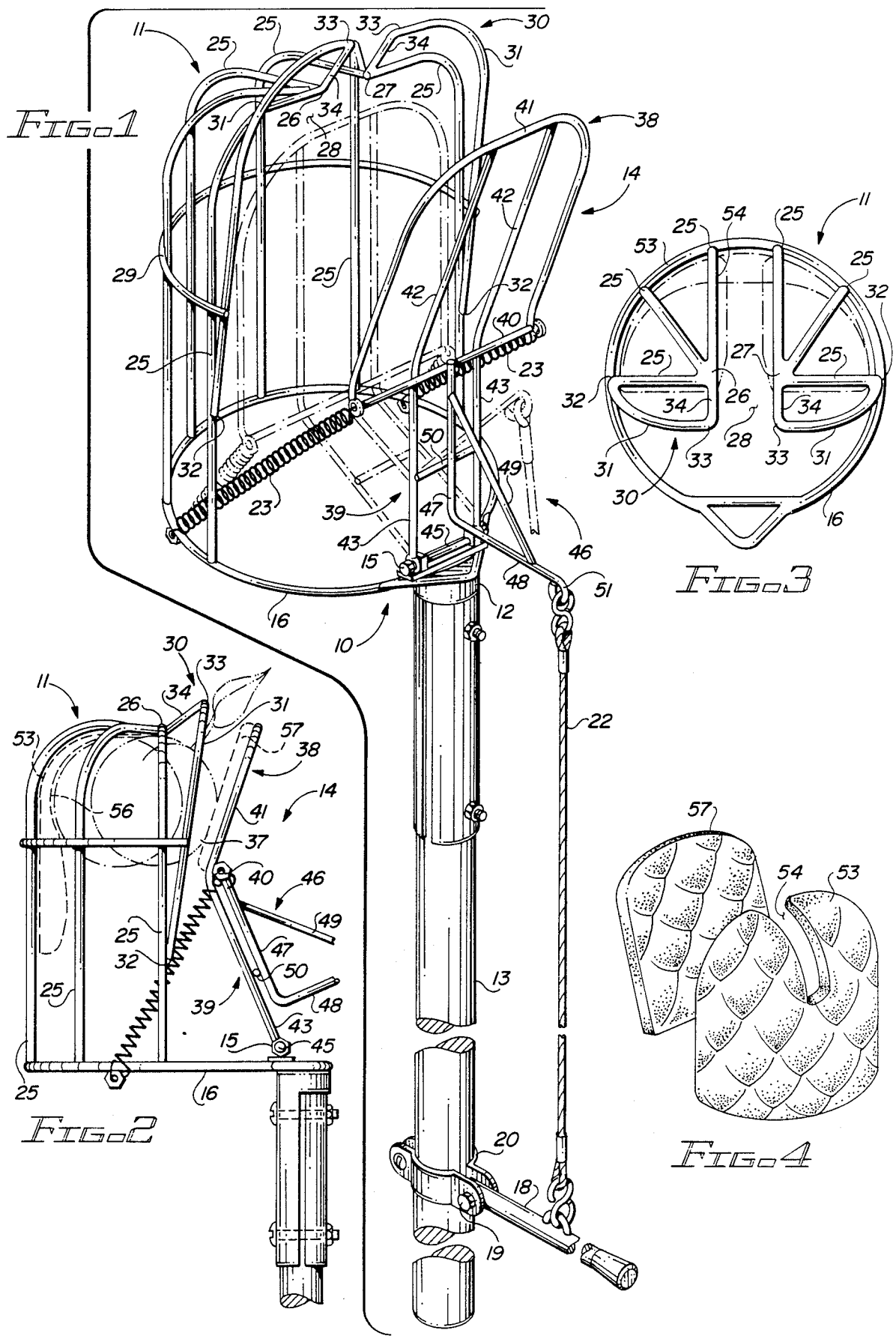

HAND-OPERATED FRUIT PICKER

This invention relates to an improved hand-operated fruit picker in which the fruit receiving cage is accommodated with an outwardly diverging scoop to assist in capturing clustered fruits and in which a chamber concavity extending cushioned lining is provided for safely harvesting sensitive and fragile fruits.

BACKGROUND OF THE INVENTION

The invention represents an improvement over hand-operated fruit pickers of the type such as shown in U.S. Pat. No. 4,098,062 to the same inventor, which employ opposed jaws mounted on the upper end of an elongated rod or handle to gather fruit from the branches of trees in orchards and groves. In a typical fruit picker of this type, one of the jaws is maintained in fixed position and brought adjacent a unit of fruit, while the other jaw is manipulated from the lower end of the handle by means of a cable or similar remote control device to close against the fruit, permitting it to be detached from the tree.

In the fruit picker of the '062 patent, the fixed jaw takes the form of a fruit receiving cage rigidly fastened to the upper extremity of a pole, and the movable jaw takes the form of a gate hinged to the bottom of the cage and maneuverable from an "open" position in which fruit can be guided into the cage opening to a "closed" position in which the fruit is securely grasped between the gate and the interior of the cage. With the fruit thus clasped by the picker in the gate closed position, it can be rotated or twisted to break its stem attachment to the branch. Reopening the gate after detachment then releases the fruit into a suitable receptacle, such as a bag or chute attached to the bottom of the cage.

The particular embodiment of picker disclosed in the '062 patent has a cage framework comprising a plurality of bowed ribs extending upwardly from angularly displaced positions along a rear half of a bottom ring which is attached at its front to the upper extremity of a pole. The gate is a wire framework member formed of angularly offset upper and lower sections, pivotally attached at its base to the bottom ring atop the pole, and spring biased toward a gate closed position. The cage is configured with a central longitudinal slit running from back to front at the top of the cage, which serves to permit the fruit to be guided by its stem into the interior chamber of the cage prior to or simultaneously with closing the gate. Other arrangements of pickers are disclosed in the cited references listed in the '062 patent.

SUMMARY OF THE INVENTION

The present invention improves over conventional fruit picker arrangements by providing an outwardly diverging scoop-like extension at the fruit receiving opening of the cage of the picker to serve as an aid in gathering clustered fruits into the cage. The invention also improves over existing pickers by providing a contoured fruit cushioning lining to assist in the picking of the more sensitive and fragile fruits.

In one aspect of the invention, described in greater detail below, the bowed ribbed structure of an upper centrally slitted cage of a fruit picker is provided with an outwardly projecting, upwardly angled scoop-like extension at its front end which serves to gather the outlying cluster fruits inwardly toward the cage opening. In a preferred embodiment, the scoop extends upwardly at an angle with the top of the cage of 120°–165°.

In another aspect of the invention, a contoured fruit cushioning liner is provided in the form of an inwardly concave contoured element mounted within the top chamber of a fruit picker cage, and another liner element mounted on the inside surface of the movable gate.

While the improvements represented by the present invention are described below in connection with embodiments of fruit pickers such as described in U.S. Pat. No. 4,098,062 to the same inventor, the same have application to fruit pickers having other configurations.

BRIEF DESCRIPTION OF THE DRAWINGS

Embodiments of the invention have been chosen for purposes of illustration and description, and are shown in the accompanying drawings, wherein:

FIG. 1 is a perspective view of a hand-operated fruit picker to which the principles of the invention have been applied;

FIG. 2 is a side elevation view of the picker of FIG. 1;

FIG. 3 is a top plan view of the same; and

FIG. 4 is a perspective view of picker liner elements in accordance with the invention.

Throughout the drawings, like elements are referred to by like numerals.

DESCRIPTION OF THE PREFERRED EMBODIMENTS

FIGS. 1–3 illustrate a hand-operated fruit picker of the type described in U.S. Pat. No. 4,098,062, modified in accordance with the principles of the invention.

The picker 10 comprises a cage or basket 11 rigidly mounted by means of a socket 12 to the upper extremity of an elongated pole or handle 13. A gate 14 is hinged upon a horizontal pivot 15 attached to a bottom ring 16 of the cage 11, just above the apex of and projecting perpendicularly from the pole 13, to swing from a gate "open" position (shown in solid lines in FIG. 1) to a gate "closed" position (shown in dot-dash lines in FIG. 1). A lever 18 pivotally attached at 19 by means of a split collar 20 to the lower end of the handle 13 (see FIG. 1) is operatively connected by means of a control cord 22 to an outer end of the gate 14 for operator manipulation of the gate between its open and closed positions. Spiral springs 23 serve to bias the gate 14 into its closed position.

The cage 11 comprises a series of bowed ribs 25 which extend upwardly at angularly spaced intervals about the upper surface of the rear half of the ring 16 to form a symmetrical framework above the ring into whose interior fruit can be captured under the clamping force exerted by the gate 14. Each rib 25 extends vertically for a length before turning inwardly and generally radially toward the top central region of the cage 11. The ribs of each rear quadrant of the bottom ring 16 terminate at a juncture at the top center of the cage, with the respective juncture points 26, 27 of those quadrants and the rearmost ribs 25 being laterally spaced to provide a forwardly directed central longitudinal slit 28 in the top of the cage 11 into which the stems of the fruit can be guided. A hoop member 29 oriented parallel to the bottom ring 16 at a point intermediate the bottom and top of the cage 11 joins intermediate points of the vertical lengths of the ribs 25 to provide rigidity to the framework structure. The radially inward bowing of the ribs 25 at the top of the cage 11 provides a horizontally restricted area of concave shape in its upper regions, which has advantages as disclosed with respect to similar structure in the '062 patent.

It will be obvious to those skilled in the art to which the invention relates that, while the concave shaped fruit capture area of the embodiment shown in FIG. 1–3 has a horizontally restricted area formed by a rib structure having ribs 25 that turn inwardly only at their upper ends, the use of ribs having an indentation in the proximity of their midpoints to form a more pronounced concavity (as shown in FIGS. 1–3 of the '062 patent) would also be acceptable for obtaining the fruit restricting area of the upper regions of the picker 10. For a clustered fruit picker of the type to which the improvements of the present invention is directed, however, it is preferred to have a horizontally restricted area having a less extensive concavity and whose ribbed framework is not centrally indented.

In accordance with the principles of the invention, and in contrast to conventional pickers such as that shown in the '062 patent, an outwardly diverging scoop-like extension 30 is formed at the top forward margin of the cage 11, ahead of and reaching upwardly from the foremost, diagonally opposed rib members 25.

As shown in FIGS. 1–3, the scoop 30 comprises laterally opposing, arched rails 31 which diverge outwardly and upwardly from connective points 32 on the forward surfaces of the foremost ribs 25 to elevated points 33 in the central region of the top of the cage 11, spaced forwardly and above the upper extremities of the foremost ribs 25. Bridge members or extenders 34 join the juncture points 26, 27 to the points 33. The respective bridge members 34 are positioned in parallel, laterally spaced relationship in alignment with the rearmost ribs 25 with the space therebetween acting to continue the central slit 28 into the scoop extension 30. The curvature inward and forward of the rails 31 is best seen in FIG. 3, which also shows the parallel run of the foremost members 25 and the extenders 34 to provide the fowardly and diagonally extending stem channelling slit 28.

Scoop 30 functions in the picking of clustered fruit, as shown in FIG. 2, to gather the fruit into the chamber of the upper region of the cage 11 and hold it captive by closing the gate 14. FIG. 2 illustrates such gathering by showing a plurality of clustered fruits 37, indicated in phantom lines. The scoop 30 has been found to be very effective for the gathering of such clustered fruit into the concave upper chamber of the cage 1. In its preferred configuration, the scoop 30 extends upwardly at an angle with the top of the cage 11 of between 120° and 165°. An advantageous working relationship is to have the bridge members 34 oriented to run upwardly at an angle of 145° relative to the adjacent horizontal portions at the top of the rearmost ribs 25.

The gate 11 may be more or less of conventional construction, having a configuration not unlike that shown for the gate of the exemplary prior art fruit picker described in the '062 patent. As shown in FIGS. 1 and 2, the gate 14 may be formed with an upper section 38 and a lower section 39, oriented with respect to each other at an angle of 135° ($\pm 15°$) as contemplated for the fruit picker in the '062 patent. The upper section 38 is more or less planar, comprising an upper cross member 40 from the ends of which extends a rounded outer band member 41 which defines the fruit contacting area of the gate 14 and is dimensioned and configured so that it can be received within the frontal opening of the cage 11. For the clustered fruit gathering function intended for the described picker 10, the band 41 assumes a generally inverted "U" shape of sufficient expanse to retain fruit within the upper region of the cage 11 when the gate 14 is brought into its closed position (see FIG. 1). The central region of the upper section 38 of the gate 14 is occupied by a plurality of spaced struts 42 whose purpose is to fill in the gate area defined between the members 40 and 41 and to prevent the escape of the fruit. FIG. 1 illustrates two strut members 42 running perpendicularly from the cross member 40 to the top of the band 41. The lower section 39 of the gate 14 is constituted as shown by support legs 43 extending in parallel from a lower cross member 45 at pivot point 15 to the cross member 40. The section 39 serves the purpose of supporting the operative upper section 38 relative to the pivot point 15.

The remainder of the gate structure consists of a triangular shaped member 46, having two legs 47, 48 of approximately the same length and a diagonal member 49 extending between the outer ends of those legs. The leg 47 is attached firmly to the lower section 39 of the gate 14 at a position intermediate to and parallel to the legs 43 by means including a cross member 50 extending therebetween. The free end of the leg 48 terminates in an eye 51, to which control cord 22 is attached at the cord's upper end. As previously indicated, the lower end of the control cord is fastened to the lever 18 which is pivotally attached at 15 to the collar 20.

As with the conventional picker shown in the '062 patent, the cage and gate of the illustrated fruit picker 10 can be constructed of aluminum, sheet metal, plastic or heavy wire. A preferred construction utilizes brazed or welded heavy metal wire elements, which may be coated with vinyl or other suitable covering for wear protection from the elements and for more gentle handling of the fruits. This should be sufficient protection for gathering fruits such as oranges, grapefruits and the like which have a thick outer skin. For handling more fragile fruits, such as peaches, pears, kiwi fruits and the like, a fruit cushioning lining, as shown in FIG. 4, can be applied to the interior surfaces of the cage 11 and the gate 14 that will come into contact with the fruit during the picking procedure. The general use of rubber strips or soft plastic linings to protect soft skinned fruit or fragile fruit, such as avocado and pear, is suggested in the '062 patent. Linings such as those shown in dashed lines in FIGS. 2 and 3 and in solid lines in FIG. 4 are, however, not taught by the '062 reference.

As already mentioned, for large clustered fruits such as oranges and grapefruits, the horizontally restricted area forming the upper chamber of the cage, and the corresponding complementary gate structure, is preferably formed without an indentation mid-height of the upright portions of the ribs 25. The cage 11 formed without this indentation nevertheless achieves the advantageous concavity in its upper chamber, but to a lesser extent and only at its top end. This is considered sufficient for harvesting large fruits and beneficial when harvesting clusters of such fruits. For gathering smaller and often more fragile fruits, however, the fuller concavity provided by the midheight indentation may be desired. Toward that end, a cage lining element 53 shown in dashed lines in FIG. 2 and 3 is contoured in a tapered configuration with a greater thickness at its lower end, so as to extend the effective concavity of the upper chamber of the cage 11.

As illustrated in FIGS. 2 and 3, the lining element 53 is situated within the inner perimeter of the half-domed top section of the cage 11, from the foremost ribs 25, rearwardly and downwardly back to a line parallel with the hoop member 29 and approximately midway between the member 29 and the bottom ring 16. The element 53 includes a central elongated slit 54 (see FIGS. 3 and 4) which matches and runs coextensively with the central slit 28 provided in the framework structure of cage 11. As shown in FIG. 2, the element 53 includes a top portion occupying the periphery of the upper portion of the cage, and a centrally thickened bottom portion depending therefrom (see FIG. 3). The lining 53 is shaped on its outer surface to match the internal dimensions of the cage chamber and be received flush against the inner walls thereof. The inner surface of the lining 53 is contoured to provide a concavity 56 (FIG. 2) more extensive than the concavity otherwise provided by the non-indented ribs 25 in the upper chamber of the cage 11, and serves to provide a gentle surface to cradle the more sensitive and fragile fruits.

Completing the lining structure contemplated by the improvements of this invention is a gate lining element 57 (FIGS. 2 and 4) of generally uniform planar cross-section and shaped to match the internal surface of the upper section 38 of the gate 14. For the configuration of gate 14 shown in FIGS. 1 and 2, the liner 57 assumes a planar solid shape having an inverted "U"-shaped top edge and a straight bottom, thereby giving a bread slice-like overall appearance (FIG. 4).

The liner elements 53 and 57 are preferably formed of resilient, padded materials, such as rubberized cushion fabric or plastic foam materials which are weather resistant, rot and mildew proof. The liners can be attached to the cage 11 and gate 14 by any suitable means, such as wiring. The attachment means is preferably, however, of a hook and eye or other releasable type which permits the ready attachment and detachment of the liner as desired. As shown in FIG. 4, the liner material is preferably formed to give a tufted texture which offers additional fruit cushioning benefits.

A bag or chute (not shown) is attached in well known manner to depend circumferentially from the bottom ring 15 of the cage 11, to serve as a receptacle or a conduit for receipt of the fruits after picking and release from the clamping action of gate 14.

In operation, as with conventional pickers, the picker 10 is hoisted atop pole 13 in proximity to the clustered fruit hanging on the branches of a tree. The pole is manipulated to bring the stem of the fruit into alignment with the central slit 28 on the top of the cage 11, with the lever 18 shifted downward to hold the gate 14 in its open position against the bias of the springs 23. When the fruit units are positioned in the opening of the cage 11, the lever 18 is brought up to permit the gate 14 to swing toward its closed position. This action gathers the fruit into the cage and holds it securely enough to permit the stem connection to be broken. The clamping action of gate 14 is then released by again lowering the lever 18, and the gathered fruit is deposited into a bag or other receptacle through the center of the bottom ring 16. The scoop 30 marginally positioned in outwardly diverging manner at the gate opening of the cage 11, acts to "mother" clustered fruits inwardly toward the central slit 28. The cushioning liners 53, 57 protect the more sensitive and fragile fruits against damage from the clamping action during picking. The wider mouth provided by the scoop 30 at the cage opening assists greatly in preventing members of a fruit cluster from being inadvertently dropped to the ground outside the picker during the breaking of the stem attachment of other members of the cluster.

As is evident from the foregoing illustrative examples, the invention provides an improved hand operated fruit picker especially useful in the gathering of clustered fruits and useful and versatile in the gathering of more sensitive and fragile fruits.

It is noted that while the frameworks of the cage and gate members have been shown comprising ribbed structures with wire or rod-like elements having spaces therebetween, the same may be constituted by wider or more expansive solid elements. The contour of the cage between the rearmost and foremost ribs 25 of each rear quadrant of the cage 11 could, for example, be formed from a single sheet of material. Likewise, the upper section 38 of gate 14, rather than having spaced struts 42 could be constituted by a solid piece having an inverted "U"-shaped top edge and a straight bottom edge. So, too, the contour of the scoop 30 can be achieved using sheet material. It is also noted that while the opposing jaws of the picker 10 are described utilizing a stationary cage as one jaw and a moveable gate hinged thereto as the other jaw, it is the relative movement that provides the desired clamping, and the same may be achieved, albeit perhaps less desirably, by an arrangement in which the gate is held stationary and the cage is moved. Those skilled in the art to which the invention relates will appreciate that various other substitutions and modifications other than those already mentioned may also be made to the embodiments described above, without departing from the spirit and scope of the present invention as defined by the claims appended hereto.

What is claimed is:

1. In a hand-operated fruit picker of the type employing a first jaw defining a fruit gathering chamber having a fruit receiving frontal opening; and a second jaw hinged to said first jaw for selective movement between a jaw open position in which said second jaw is pivoted away from said first jaw so that fruit can be brought into said chamber through said opening, and a jaw closed position in which said second jaw is pivoted toward said first jaw so that fruit brought into said chamber can be securely grasped therein for picking, said second jaw being dimensioned and configured to be received within said opening, the improvement comprising:
   said first jaw having an outwardly and upwardly diverging scoop-like extension formed marginally of said opening to provide a widened mouth extending beyond said opening and which is operable as an said to gather fruits into said chamber.

2. The improvement as in claim 1, wherein said extension makes an angle of 120°-165° with the top of said first jaw.

3. The improvement as in claim 2, wherein said angle is 145°.

4. The improvement as in claim 1, wherein said first jaw further has a central forwardly directed longitudinal slit at the top of said opening into which the stems of fruits can be guided, and said extension is formed with a space that acts to continue said slit into said extension.

5. The improvement as in claim 1, further comprising a contoured fruit cushioning lining located peripherally within said chamber, whereby sensitive and fragile fruits are protected during operation of said picker.

6. The improvement as in claim 5, wherein said lining comprises a tufted, weather resistant resilient material.

7. The improvement as in claim 5, wherein said chamber has an internal configuration including an upper concavity, and said lining is contoured to change said configuration by extending said concavity.

8. The improvement as in claim 7, wherein said first jaw further has a central forwardly directed longitudinal slit at the top of said opening into which the stems of fruits can be guided, and said lining is further provided with a central elongated slit which matches and runs coextensively with said longitudinal slit.

9. The improvement as in claim 8, further comprising a second lining located on fruit contacting areas of said second jaw.

10. In a hand-operated fruit picker of the type employing a first jaw defining a fruit gathering chamber having a fruit receiving frontal opening and an internal configuration including an upper concavity; and a second jaw hinged to said first jaw for selective movement between a jaw open position in which said second jaw is pivoted away from said first jaw so that fruit can be brought into said chamber through said opening, and a jaw closed position in which said second jaw is pivoted toward said first jaw so that fruit brought into said chamber can be securely grasped therein for picking, the improvement comprising:

a first fruit cushioning lining located peripherally within said chamber and being contoured to change said configuration be effectively extending said concavity.

11. The improvement as in claim 10, wherein said first jaw further has a central forwardly directed longitudinal slit at the top of said opening into which the stems of fruits can be guided, and said first lining is further provided with a central elongated slit which matches and runs coextensively with said longitudinal slit.

12. The improvement as in claim 11, further comprising a second fruit cushioning lining located on fruit contacting areas of said second jaw, and wherein said first and second linings comprise linings of tufted, weather resistant resilient material.

13. A hand-operated fruit picker, comprising:
an elongated handle;
a first jaw defining a fruit gathering chamber having a fruit receiving frontal opening, an internal configuration including an upper concavity and a central forwardly directed longitudinal slit at the top of said opening which serves to permit fruits to be guided by their stems into the interior of said chamber at said concavity; said first jaw being provided with an outwardly and upwardly diverging scoop-like extension formed marginally of said opening to provide a widened mouth extending beyond said opening which is operable as an aid to gather fruits into said chamber, and which is formed with a space that acts to continue said slit into said extension;
means rigidly fastening said first jaw adjacent one end of said handle;
a second jaw hinged to said first jaw, said second jaw being dimensioned and configured to be received within said opening; and
means remotely operable from the other end of said handle for moving said second jaw between a jaw open position in which said second jaw is pivoted away from said first jaw so that fruit can be brought into said chamber through said opening, -and a jaw closed position in which said second jaw is pivoted toward said first jaw so that fruit brought into said chamber can be securely grasped therein for picking.

14. A picker as in claim 13, wherein said extension makes an angle of 120°-160° with the top of said first jaw.

15. A picker as in claim 14, wherein said angle is 145°.

16. A picker as in claim 14, further comprising a contoured fruit cushioning lining located peripherally within said chamber and being contoured to effectively extend said concavity.

17. A hand-operated fruit picker, especially suited for the harvesting of clustered fruits, comprising:
a cage having a bottom ring, and a plurality of bowed members extending upwardly and inwardly at angularly spaced intervals about said ring to define a fruit gathering chamber having a fruit receiving frontal opening, an internal configuration including an upper concavity, and a central forwardly directed longitudinal slit at the top of said opening which serves to permit fruits to be guided by their stems into the interior of said chamber at said concavity; and an outwardly diverging scoop-like extension formed at a top forward margin of said opening, ahead of and reaching upwardly from the foremost surfaces of said bowed members to provide a widened mouth extending beyond said opening which is operable as an aid to gather clustered fruits into said chamber, and which is formed with a space that acts to continue said slit into said extension;
a gate having angularly offset upper and lower sections, with said lower section being hinged to said ring and being movable from an open position in which said upper section is pivoted away from said opening so that fruit can be brought into said chamber through said opening, and a closed position in which said upper section is pivoted toward said opening so that fruit brought into said chamber can be securely grasped therein for picking; said gate being dimensioned and configured to be received within said opening.

18. A picker as in claim 17, wherein said extension comprises laterally opposing, arched rails which diverge outwardly and upwardly from connective points on the foremost surfaces of said bowed members to elevated points in a top central region of said cage, spaced forwardly and above the upper extremities of the bowed members and respectively aligned with the sides of said longitudinal slit.

19. A picker as in claim 17, further comprising a tapered fruit cushioning lining located peripherally within said chamber and being contoured with an outer surface shaped to match internal dimensions of said chamber and an inner surface contoured to effect a peripheral indentation of said chamber intermediate said ring and the top of said cage which serves to change said chamber internal configuration by extending said chamber concavity.

20. A picker as in claim 18, wherein said bowed members comprise ribs spaced at intervals about rear quadrants of said ring to form a framework into whose interior fruit can be captured, each rib extending vertically for a length before turning inwardly and generally radially toward said top central region of said cage, the adjacentmost ribs of each quadrant running along laterally spaced parallel courses to define said slit, and the inwardly and radially turning of said ribs providing said concavity; and wherein said extension further comprises bridge members positioned in parallel, laterally spaced relationship in alignment with said adjacentmost ribs, with the space therebetween acting to continue the slit into the scoop extension; said bridge members being upwardly angled relative to said adjacentmost ribs at substantially 145 degrees.

* * * * *